United States Patent [19]

Buhrer

[11] Patent Number: 5,132,822
[45] Date of Patent: Jul. 21, 1992

[54] OPTICAL SWITCH

[75] Inventor: Carl F. Buhrer, Framingham, Mass.

[73] Assignee: GTE Laboratories Incorporated, Waltham, Mass.

[21] Appl. No.: 620,233

[22] Filed: Nov. 29, 1990

[51] Int. Cl.[5] .................. G02F 1/1335; G02B 6/28
[52] U.S. Cl. ................................ 359/63; 359/71; 359/247; 359/251; 385/8
[58] Field of Search ............. 350/96.14, 391, 394, 350/402, 347 R; 359/63, 71, 246, 247, 251, 256; 385/8

[56] References Cited

U.S. PATENT DOCUMENTS

| | | | |
|---|---|---|---|
| 4,278,327 | 7/1981 | McMahon et al. | 350/347 V |
| 4,421,383 | 12/1983 | Carlsen | 350/96.21 |
| 4,478,494 | 10/1984 | Soref | 350/381 |
| 4,514,047 | 4/1985 | Haskal et al. | 350/394 |
| 4,516,837 | 5/1985 | Soref et al. | 350/347 V |
| 4,720,171 | 1/1988 | Baker | 350/96.14 |
| 4,755,038 | 7/1988 | Baker | 350/96.14 |
| 4,784,470 | 11/1988 | Baker | 350/96.14 |
| 4,822,150 | 4/1989 | Duarte | 350/394 |
| 4,930,878 | 6/1990 | Bergner et al. | 350/394 |
| 4,948,228 | 8/1990 | Keens | 350/286 |
| 4,948,229 | 8/1990 | Soref | 350/96.14 |

OTHER PUBLICATIONS

J. A. Apfel, "Graphical Method to Design Internal Reflection Phase Retarders," Applied Optics, vol. 23, No. 8, pp. 1178-1183 (Apr. 1984).

Primary Examiner—Bruce Y. Arnold
Assistant Examiner—Martin Lerner
Attorney, Agent, or Firm—Lawrence E. Monks

[57] ABSTRACT

An optical switch for arbitrarily polarized light having low cross-talk is made in which an input beam is split into its TE (s wave) and TM (p wave) polarization components, the TM component is converted to TE by total internal reflection, the two beams are either reflected or transmitted by liquid crystal cells, one of the beams is then converted to TM polarization, again by total internal reflection, and the two beams are recombined and outputted from one of two ports.

4 Claims, 6 Drawing Sheets

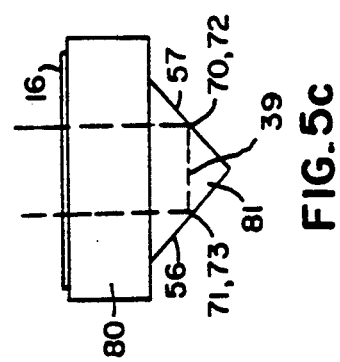
FIG.5c
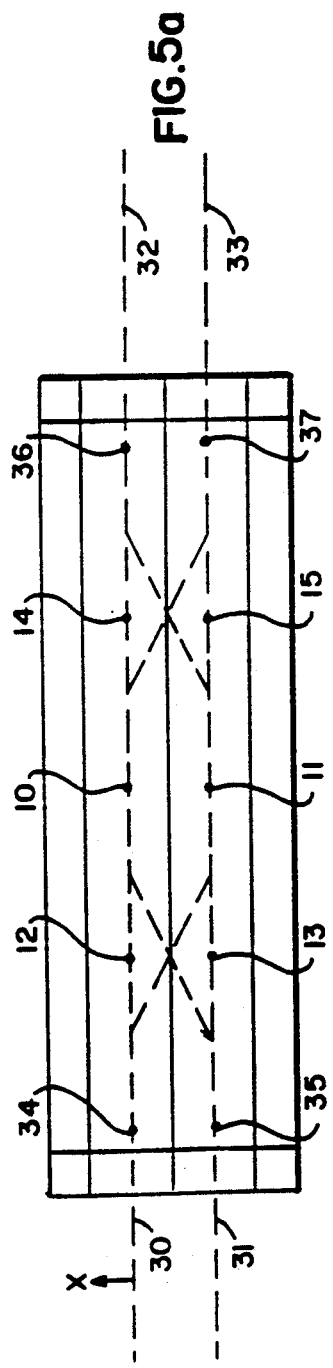
FIG.5a
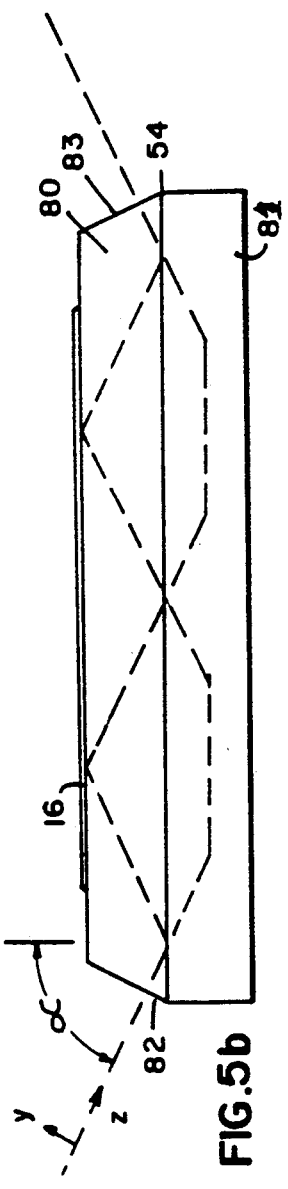
FIG.5b
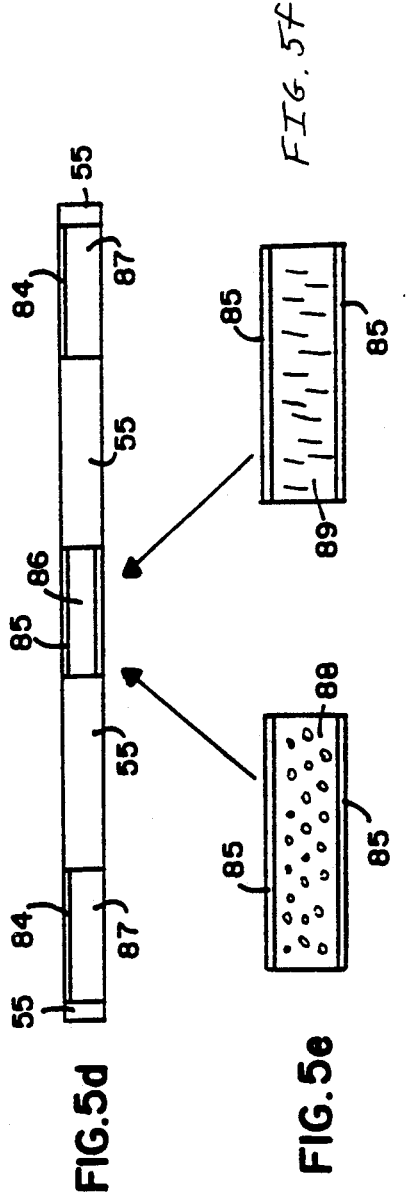
FIG.5d
FIG.5e
FIG.5f

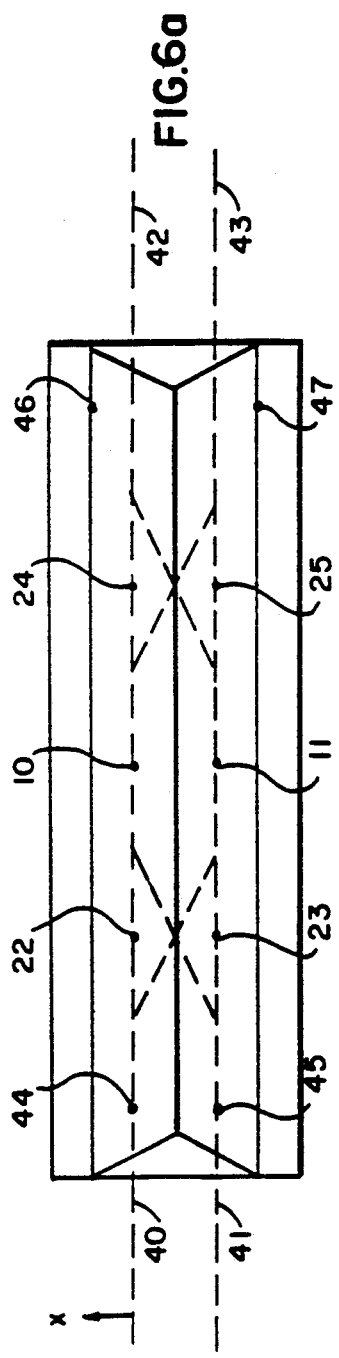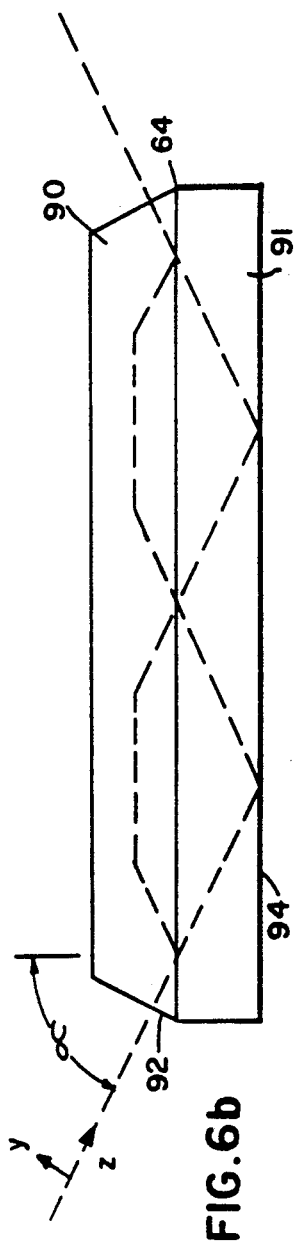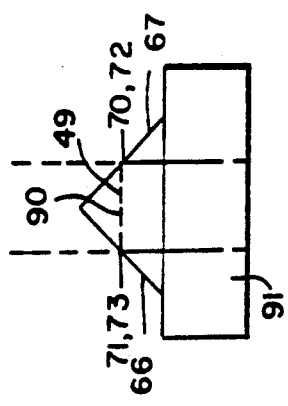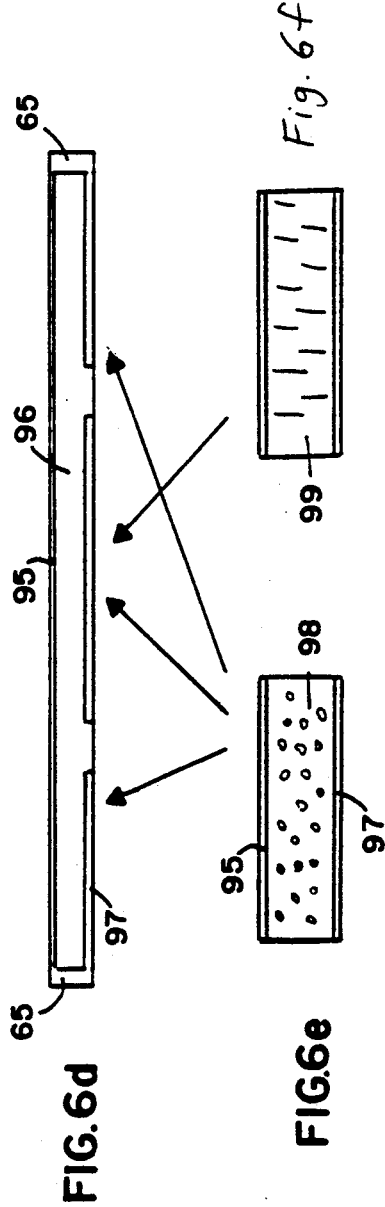

OPTICAL SWITCH

FIELD OF THE INVENTION

This invention pertains to electro-optic devices for switching optical signals and more particularly two-state optical switches which couple preselected pairs of terminals in each switch state.

BACKGROUND OF THE INVENTION

Fiber optic technology has provided a medium of ever increasing importance for the transmission of wide bandwidth data signals. Long distance telephony is now essentially all digitized, and these data signals are often multiplexed along with computer communications for transport over long routes via intermediate repeater facilities. All of the circuit switching, which routes individual components of the multiplexed signal along different paths, is done while the signals are in electrical form at the repeater facilities. But there is a need for a fiber optic switch for facilities switching, that is, the replacement of portions of the fiber optic link that may fail or for the redirection of an entire multiplexed optical signal over an alternate route.

Optical fiber switches that reposition the cleaved end of one input fiber in close proximity to the cleaved end of one of two alternative output fibers are difficult to construct because of the very small fiber cores in the single mode fibers usually used in communications systems. The switching of planar guided waves in electro-optic films can be fast, but requires the coupling of polarized light from a fiber into the planar guide, and this often results in light loss. Other types of switches have been made by expanding the fiber guided light into a parallel beam by means of a lensing device. Some operate by the repositioning of a mirror or prism to intercept input and output beams in alternative ways and are usually polarization independent. Others redirect the beams by manipulating polarization states and often make use of liquid crystal media.

One type of liquid crystal based optical switch has been constructed using a twisted nematic cell, a switching element that rotates the plane of polarization 90 degrees when in the unactivated state and 0 degrees when the cell is activated by the application of an AC electric field. Arbitrarily polarized input light must first enter a polarizing beam splitter to be separated into two orthogonal plane polarized optical components. These are passed separately at normal incidence through different sections of the twisted nematic cell where their polarizations states are controlled by the voltage applied to the cell electrodes. They are then recombined into one of two alternative outputs in a second polarizing beam splitter. In the optical bypass switch described by Soref in U.S. Pat. No. 4,478,494 a single polarizing beam splitter is used both to separate and to recombine the two orthogonal polarization components, but three additional prisms are required to direct the light within the device and to contain the liquid crystal media.

A different switching mechanism is used by Soref and McMahon in U.S. Pat. No. 4,516,837. A nematic liquid crystal between two high index glass prisms results in the total internal reflection of an obliquely incident beam, but the reflection of the transverse magnetic TM wave polarized with its electric field vector in the plane of incidence (p wave) may be inhibited by an applied field across the liquid interfacial layer, while the transverse electric TE wave polarized perpendicular to the plane of incidence (s wave) will continue to be reflected. Transparent indium tin oxide electrodes on the prisms are coated with an alignment film to orient the extraordinary liquid crystal axis in the plane of incidence when the field is off. It can be realigned parallel to an applied field because of its positive dielectric anisotropy. But since only TM polarized light (p wave) is switched from reflection to transmission by an AC voltage applied to the electrodes, arbitrarily polarized input light must first be separated into its two orthogonal TM and TE components. The latter is converted to TM by a half wave birefringent plate and both are passed separately through different sections of the nematic liquid crystal interfacial layer. Both components are thereby directed to one of several alternative output ports at which are located half wave plates and polarizing beam splitter prisms to recombine both components into individual outputs.

Soref and McMahon also showed that if the alignment films on the cell electrodes were prepared so as to orient the extraordinary axis of the nematic liquid crystal interfacial layer perpendicular to the plane of incidence both polarization states could be switched. In U.S. Pat. No. 4,278,327 they describe an optical switch that uses one region of such an interfacial layer to reflect the TM (p wave) and transmit the TE (s wave) polarization components of an arbitrarily polarized input light wave after which both are reflected back to a second region of the same liquid crystal interfacial layer. When an AC voltage is applied only to electrodes in the second region the TM (p wave) component is transmitted and the TE (s wave) component is reflected, the opposite as that in the first region of the liquid crystal layer where the electrodes are left unactivated. Both polarization components are thereby directed to one of two alternative output ports by the applied AC voltage. The switch does not require separate multilayer coated polarizing beam splitting prisms.

All of the prior art liquid crystal switches described above exhibit cross-talk to some extent, and the principal cause is the partial reflection of a wave polarization component that should nominally be transmitted at some interface. In addition, the multilayer coatings in polarizing beam splitter prisms usually reflect a small but significant fraction of the TM (p wave) polarization state which should be totally transmitted. The liquid crystal interfacial layer when nominally transmitting a polarization component will usually reflect a small fraction of its intensity because of the differing refractive indices of the surrounding prism, the transparent electrodes, and the liquid crystal medium.

OBJECTS OF THE INVENTION

Accordingly, it is the primary object of this invention to provide a low crosstalk, electrically controlled, liquid crystal matrix switch of simplified construction which directs a pair of light beams coupled from two input fibers in two alternative ways for coupling to two output fibers.

Another object is to provide an electrically controlled liquid crystal switch operable with an arbitrarily polarized input beam without the need for separate polarizing beam splitters.

A further object is to provide an electrically controlled liquid crystal switch that requires two glass prisms and no additional birefringent crystal retardation plates.

SUMMARY OF THE INVENTION

In a first aspect of the invention an optical switch inputs an arbitrarily polarized light beam in a first port, splits said input beam into a second beam having TE (s wave) polarization and a third beam having TM (p wave) polarization by a multilayer thin film beam splitting coating within a two glass prism configuration. The third beam is then converted to TE polarization by total internal reflection within a prism having a right triangular cross section. These second and third beams are directed to nematic liquid crystal cells which are transparent to the TE (s wave) polarization state in their off states but reflect the TE (s wave) polarization beams when the cells have an electric field of greater than threshold values applied thereto. After the beams are acted upon by the nematic cell, one of the beams is converted to TM (p wave) polarization and the second and third beams are combined and exit a third or fourth port depending upon the on or off state of the nematic cell.

In a second aspect of the invention, the inputted light beam is both polarization split and then recombined by interfacial layers of liquid crystal within a two glass prism configuration.

BRIEF DESCRIPTION OF THE DRAWINGS

FIGS. 5a, 5b, and 5c are plan, front elvation and side elevation views, respectively, of the embodiment of the invention set forth in FIG. 1.

FIG. 5d is a front elevation view, greatly enlarged, of the interfacial layer between the two prisms of the embodiment of the invention set forth in FIG. 1.

FIGS. 5e and 5f are front elevations of the nematic liquid crystal cell of the interfacial layer of the embodiment of the invention set forth in FIG. 1, showing the orientation of the nematic crystals in the off state and the on state, respectively.

FIGS. 6a through 6f set forth the same views as those in FIGS. 5a through 5f, but with respect to the embodiment of the invention shown is FIG. 2.

DETAILED DESCRIPTION OF THE PREFERRED EMBODIMENTS

In the present invention an interfacial layer of a uniaxially positive nematic liquid crystal mixture between two parallel glass prism facets coated with transparent conductive electrodes is aligned by additional films on their surfaces such that its extraordinary refractive axis is oriented perpendicular to the plane of incidence. An incident wave is split by such a liquid crystal layer in its off state into a transmitted TE (s wave) component and a reflected TM (p wave) component. When an AC electric field is applied across such a liquid crystal with positive dielectric anisotropy the extraordinary axis reorients parallel to the field and the plane of incidence causing the TE (s wave) to be reflected and the TM (p wave) to be transmitted. But this transmission of the TM (p wave) component is limited by its partial reflection from a residual boundary layer of liquid crystal adjacent to the orienting film that remains as oriented in the field off state and which persists although to lesser degrees as the applied field is increased. In both embodiments of the present invention shown in FIGS. 1 and 2 the liquid crystal switching cells operate exclusively on incident TE (s wave) polarization states thereby eliminating cross-talk due to this residual boundary layer.

Figure 1:
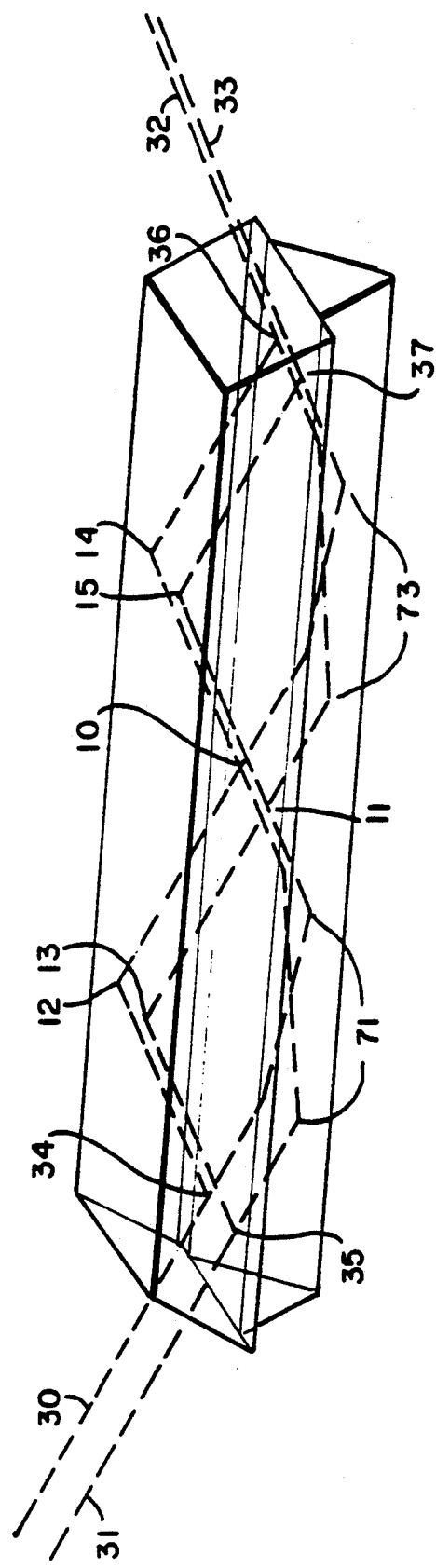
FIG. 1 is a perspective view of one embodiment of the invention.
Figure 2:
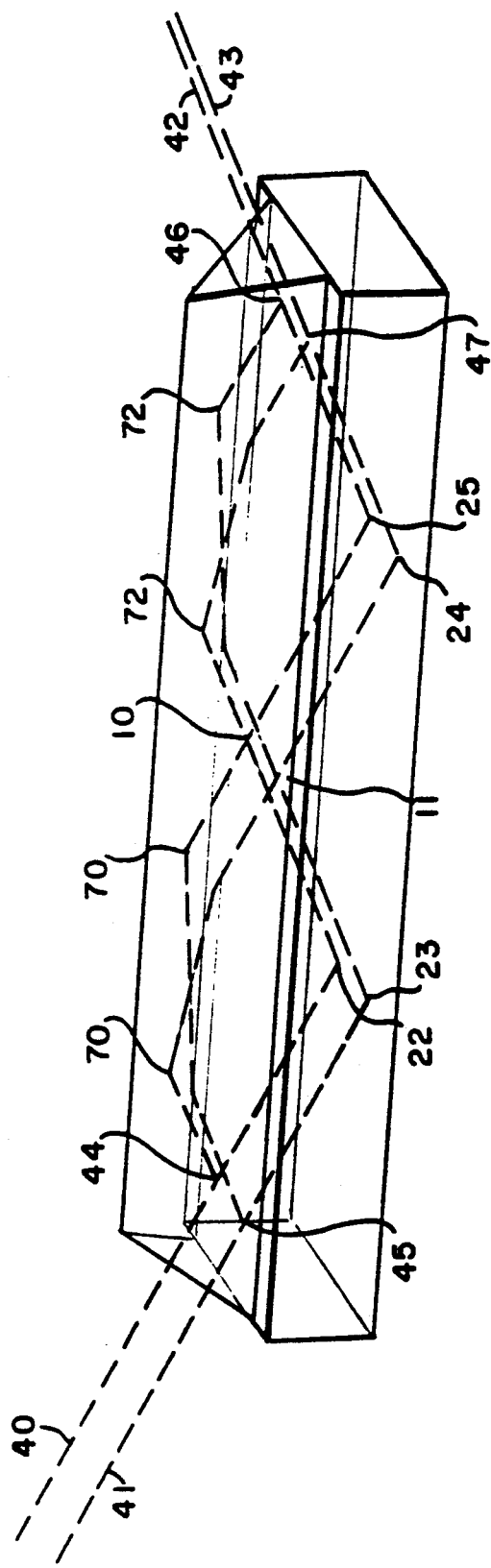
FIG. 2 is a perspective view of another embodiment of the invention.

One of two alternative and arbitrarily polarized input beams coupled by a lens from a fiber is first split into two orthogonal plane polarized components by either a multilayer thin film beam coating within the two glass prism configuration shown in FIG. 1 or by an interfacial layer of liquid crystal within the two glass prism configuration shown in FIG. 2. In either case the TM (p wave) components relative to the plane of incidence of the eletrically controlled liquid crystal cell are then converted to TE (s wave) polarization by virtue of the differential phase changes accompanying total internal reflection at two reflections within a ninety degree roof prism. The original TE (s wave) component and the TE component resulting from the conversion are then switched from transmission to reflection by an applied field in two adjacent but separate regions of the central liquid crystal cell. The two alternative output fibers are similarly coupled by lenses to the beams exiting the prisms after being polarization converted and recombined in a manner reciprocal to that of the two alternative input beams. These new configurations differ from the prior art of Soref et al. (U.S. Pat. No. 4,516,837) in that the extraordinary axis of the liquid crystal in their cell is aligned in the plane of incidence such that an applied field switches TM (p wave) components from reflection to transmission. Further, their design requires separate polarization beam splitting prisms and half wave birefringent plates.

Figure 3:
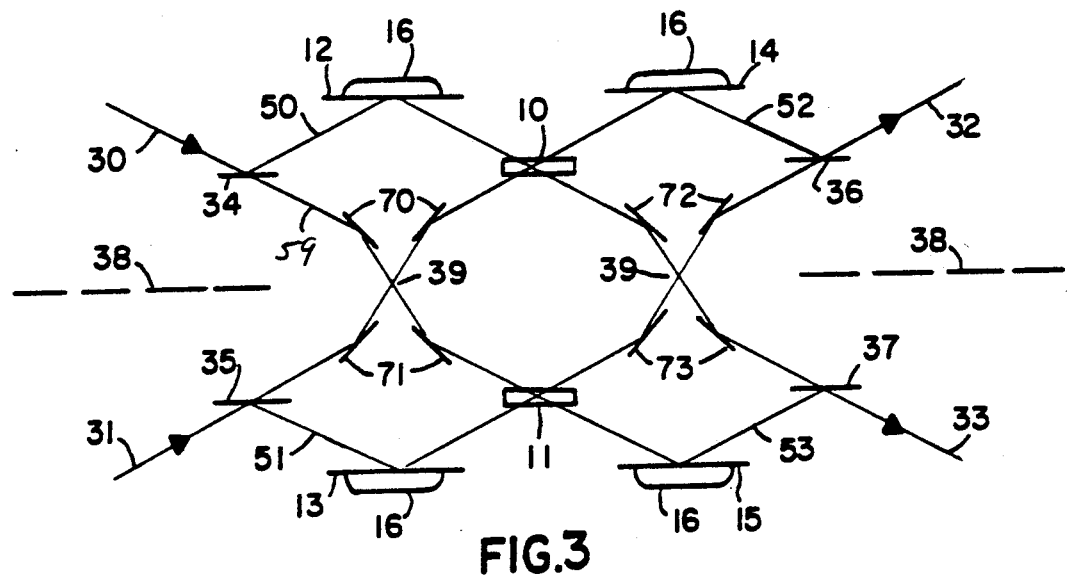
FIGS. 3 AND 4 are schematic diagrams useful in explaining the invention with respect to the embodiments of FIGS. 1 and 2, respectively.
Figure 4:
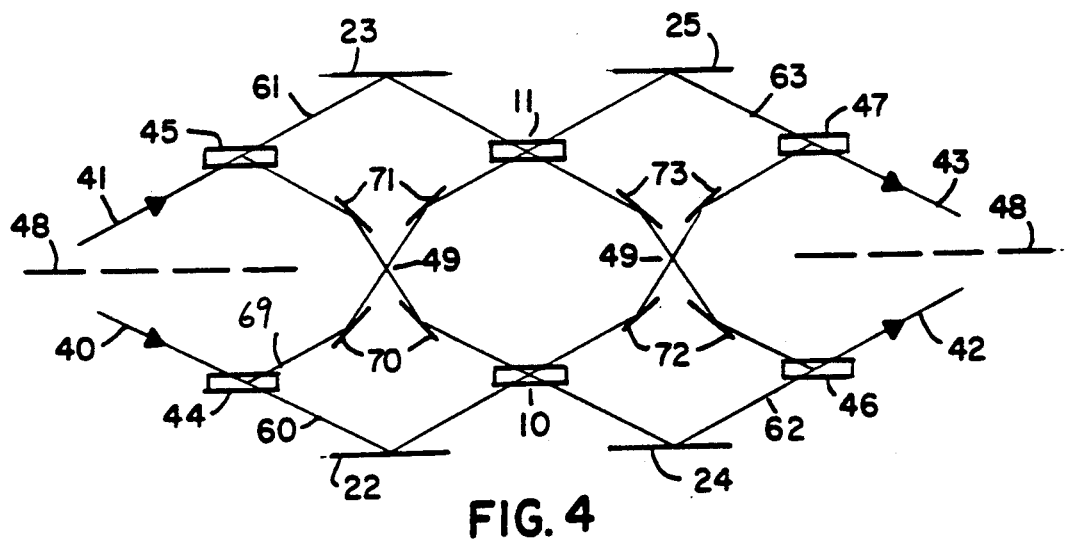

The embodiments of liquid crystal optical switches according to the present invention are shown without their four fiber coupling lenses in FIGS. 1 and 2. The optical paths through them lie primarily in two parallel planes of incidence and are shown schematically in FIGS. 3 and 4 respectively. The lower half of FIG. 3 represents the forward plane of incidence in FIG. 1 if it is folded up along line 38, while the upper half of FIG. 4 represents the forward plane of incidence in FIG. 2 if it is folded down along line 48. Path segments 39 or 49 between mirrors 70, 71, 72, and 73 connect the two planes. They correspond to beams reflected between the ninety degree angularly separated facets of the roof prisms where they undergo total internal reflection. As will be described below these opposite facets are coated with dielectric layers to modify their differential phase retardation such that together they convert TM (p wave) polarization in one plane of incidence to TE (s wave) polarization in the parallel plane of incidence.

Consider first the operation of the liquid crystal optical switch shown in FIG. 1 by referring to the schematic of FIG. 3. Beam splitting interfaces 34, 35, 36, and 37 are multilayer dielectric coated to reflect TE (s wave) and transmit TM (p wave) polarizations. Mirrors 12, 13, 14, and 15 are similarly coated but are overlaid with an absorbing material 16 to prevent reflection of any TM (p wave) component 59 reaching them. Primary input beam 30 collimated by a lens from a fiber is split by interface 34 into a TE (s wave) component 50 and a TM (p wave) component 59 which is converted to TE upon reflection at facets 70 and 71 and directed into liquid crystal cell 11. Component 50 is again reflected by mirror 12 to liquid crystal cell 10. If both cells are in their off state component 50 is transmitted through cell 10 and converted to TM (p wave) polarization upon reflection at facets 72 and 73 so that it will be transmitted by interface 37 to output 33. Component 53 after transmission by cell 11 and reflection by mirror 15 is reflected by interface 37 to also exit as output 33 for coupling by a lens to an output fiber. The symmetry of this switch shown in FIG. 1 and represented by the schematic of FIG. 3 indicates that secondary input beam 31 also collimated by a lens will exit as output 32 for coupling by a lens to an output fiber.

When both liquid crystal cells 10 and 11 are activated by the application of an AC voltage between their transparent conductive electrodes both inputs are switched to the opposite outputs. Cell 10 reflects TE (s wave) component 50 from primary input beam 30 to mirror 14 after which it is reflected at interface 36 to appear in output 32, while the reflected component from cell 11 is reconverted to TM (p wave) polarization upon reflection at facets 73 and 72 and is transmitted through interface 36 also to output 32 for coupling by a lens to an output fiber. Also because of the symmetry of this switch and its schematic, secondary input beam 31 will in the activated state of the liquid crystal cells exit as output 33. Thus, light inputs 30 and 31 with arbitrary polarization are normally directed to outputs 33 and 32 respectively, but when the liquid crystal cells are activated by an applied AC voltage they are redirected to outputs 32 and 33 respectively. The absorbing overlay coatings 16 on mirrors 12, 13, 14, and 15 essentially eliminate crosstalk arising from less than complete transmission of the TM (p wave) components at beam splitting interfaces 34, 35, 36, and 37. The small TM (p wave) component that is reflected at multilayer coated interface 34, for example, will be almost completely transmitted through the identical coating on mirror 12 and absorbed in overlay 16.

A preferred embodiment of the present invention shown in FIG. 2 may now be considered by referring to the schematic of FIG. 4. Used in place of the multilayer dielectric coated beam splitting interfaces are liquid crystal interfacial layers 44, 45, 46, and 47 which may be identical to liquid crystal cells 10 and 11, but do not require electrical activation of their electrodes. Alignment films to orient the extraordinary axes of the liquid crystal perpendicular to the plane of incidence are applied as within cells 10 and 11, and construction of the entire assembly is simplified if the electrodes cover the full extent of the prisms with segmentation to allow electrical excitation of only the central cells 10 and 11. As noted above such passive liquid crystal interfacial layers reflect TM (p wave) and transmit TE (s wave) polarization components. Mirrors 22, 23, 24, and 25 are uncoated prism surfaces at which total internal reflection takes place. Primary input beam 40 collimated by a lens from a fiber is split by interfacial layer 44 into a TE (s wave) component 60 and a TM (p wave) component 69 which is converted to TE upon reflection at facets 70 and 71 and directed into liquid crystal cell 11. Component 60 is reflected by mirror 22 to liquid crystal cell 10. If both cells are in their off state component 60 is transmitted through cell 10 and converted to TM (p wave) polarization upon reflection at facets 72 and 73 so that it will be reflected by interfacial layer 47 to output 43. Component 63 after transmission by cell 11 and reflection by mirror 25 is transmitted by interfacial layer 47 also to exit as output 43 for coupling by a lens to an output fiber. The symmetry of this switch shown in in FIG. 2 and represented by the schematic of FIG. 4 indicates that secondary input beam 41 also collimated by a lens will exit as output 42 for coupling by a lens to an output fiber.

When liquid crystal cells 10 and 11 are activated by the application of an AC voltage between their transparent conductive electrodes both inputs are switched to the opposite outputs. Cell 10 reflects TE (s wave) component 60 from primary input beam 40 to mirror 24 after which it is transmitted through interfacial layer 46 to appear in output 42, while the reflected component from cell 11 is reconverted to TM (p wave) polarization upon reflection at 73 and 72 and is reflected at interfacial layer 46 also to output 42 for coupling by a lens to an output fiber. Also because of the symmetry of this switch and its schematic, secondary input beam 41 will in the activated state of the liquid crystal cells exit as output 43. Thus, light inputs 40 and 41 with arbitrary polarization are normally directed to outputs 43 and 42 respectively, but when the liquid crystal cells 10 and 11 are activated by an applied AC voltage they are redirected to outputs 42 and 43 respectively.

The construction of the liquid crystal optical switch shown in FIG. 1 is detailed in FIGS. 5a, 5b, and 5c. Two glass prisms 80 and 81 with rectangular and 45 degree right triangular cross sections respectively are separated by a thin interfacial region 54 shown in cross section with its thickness exaggerated in FIG. 5d. The end facets 82 and 83 of prism 80 are cut at an angle to allow entry of input beams 30 and 31 and exit of output beams 32 and 33 at normal incidence and to provide for the mounting of beam forming optical fiber lens connectors such as those described by Carlsen and Melman in U.S. Pat. No. 4,421,383. The planes of incidence of beams 30 and 32 and of beams 31 and 33 at the interface 54 are parallel because of the right angle between facets 56 and 57 of prism 81. To assure that the beams reconverge after being split into their polarization components the height of prism 81 from apex to interface 54 and the height of prism 80 from mirror surfaces 12, 13, 14, and 15 to interface 54 must be equal. Within interface 54 is spacer material 55 which confines liquid crystal 86 in cells 10 and 11 and index matching oil 87. Multilayer dielectric coating 84 forms the polarization splitting interfaces 34, 35, 36, and 37 and an identical coating is applied as mirror surfaces 12, 13, 14, and 15 on top of prism 80 under absorbing material 16. Such multilayer coatings are well known in the art, and the absorbing material may be a paint consisting of a pigment such as carbon black in an index matching organic vehicle. The construction of the liquid crystal optical switch shown in FIG. 2 is detailed in FIGS. 6a, 6b, and 6c. Two glass prisms 90 and 91 with 45 degree right triangular and rectangular cross sections respectively are separated by a thin interfacial region 64 shown in cross section with its thickness exaggerated in FIG. 6d. The end facets 92 and 93 of prism 90 are cut at an angle to allow entry of input beams 40 and 41 and exit of output beams 42 and 43 at normal incidence and to provide for the mounting of beam forming optical fiber lens connectors such as those described by Carlsen and Melman in U.S. Pat. No. 4,421,383. The planes of incidence of beams 40 and 42 and of beams 41 and 43 at the interface 64 are parallel because of the right angle between facets 66 and 67 of prism 90. To assure that the beams reconverge after being split into their polarization components the height of prism 90 from apex to interface 64 and the height of prism 91 from mirror surfaces 22, 23, 24, and 25 to interface 64 must be equal. Within interface 64 is spacer material 65 which confines liquid crystal 96. Transparent electrode 95 extends along the length of prism 90, while transparent electrode 97 on prism 91 is segmented so that the central region alone can be activated to switch cells 10 and 11. The end unactivated interfacial layers 44, 45, 46, and 47 of liquid crystal 96 function in place of the multilayer polarization beam splitter coatings 84 of FIG. 5, and also eliminate the need for the identical reflective coating and absorbing overlay 16. Total internal reflection takes place at points 22, 23, 24, and 25 of uncoated lower surface 94 of prism 91.

Suitable liquid crystals for use in both optical switches are nematic mixtures of alkyl or alkoxy para cyano biphenyls available from EM Industries located in Hawthorne, N.Y. These materials, such as their types E8 or E44, have a large positive optical anisotropy and a large positive dielectric anisotropy and are operable over a wide temperature range. They fill the approximately ten micron wide region defined by spacers 55 or 65 and are activated by the application of about ten volts AC between opposing transparent electrodes. Sputtered indium tin oxide films are suitable for these electrodes and they may be coated with an additional alignment film by oblique evaporation of 0.1 to 0.2 microns of silicon monoxide or magnesium fluoride or by buffing the surface using one of a number of techniques known in the art. As described above this alignment is chosen such that in the unactivated state with no electric field applied the long axis of the elongated molecules orients perpendicular to the plane of incidence, that is, perpendicular to the planes of FIGS. 5b or 6b. This therefore is also the orientation of the extraordinary refractive index. Glass for prisms 80 and 81 or 90 and 91 is chosen to match this refractive index at the wavelength of operation so that there is no reflection of the TE (s wave) polarization state. Types SF14, SF55 and SF56 made by Schott Glass Co. of Duryea, PA are suitable choices with indices of approximately 1.76 to 1.78. The TM (p wave) polarization state reflection depends on the ordinary refractive index of the liquid crystal which is approximately 1.52. At an angle of incidence of approximately 66 degrees the TM (p wave) undergoes total reflection at the glass to liquid crystal interface.

This alignment of the nematic molecules in the unactivated state is represented by regions 88 in FIG. 5e and 98 in FIG. 6e. When the AC voltage is applied to cells 10 and 11 the molecules realign parallel to the electric field and the plane of incidence as represented by regions 89 in FIG. 5f and 99 in FIG. 6f. The TE (s wave) polarization state then depends on the ordinary refractive index of the liquid crystal and total reflection takes place in activated cells 10 and 11. Interface regions 44, 45, 46, and 47 always remain unactivated with the nematic molecules aligned as represented by region 98. Rectangular prisms 80 and 91 are wider than the associated triangular prisms to facilitate the sealing of the interfacial layers along their length and to provide contact areas for the conductive electrodes.

The interconversion of TM (p wave) and TE (s wave) polarization states upon the two step reflection by the facets of the 45 degree right triangular roof prism 81 of FIG. 5c or 90 of FIG. 6c depends on the modification of the total internal reflection taking place thereupon. Because of the changes in beam direction taking place at each reflection it is convenient to refer to polarization states relative to a set of orthogonal axes moving along with and being reflected with the light beam. In this convention the z axis is defined as the initial light beam direction in the plane of incidence at the liquid crystal cell, and the x axis is perpendicular to that plane of incidence as shown in FIGS. 5a-5b and 6a-6b. Polarization states are defined by the orientation of the optical electric field in the xy plane, the y axis being orthogonal to both x and z and in the same plane of incidence. Thus, TE (s wave) polarization corresponds to an optical electric field oriented at 0 degrees from x, while TM (p wave) polarization corresponds to the electric field at 90 degrees from x.

In the optical switches embodying the present invention, the reflecting facets 70, 71, 72, and 73 are oriented at 45 degrees from the yz plane and the beams obliquely incident upon them experience total internal reflection and a retardation equivalent to that of a linearly birefringent plate. The slow axis of this retardation is the projection in the xy plane of the normal direction at the reflecting facet. Its angular orientation $\theta$ from x for high angles if incidence $\alpha$ in the liquid crystal cell approaches +45 and −45 degrees for the opposite facet reflections. With the nematic mixtures and glass prism described above $\alpha$ would be chosen to be 66 degrees and $\theta$ may be calculated to be +42.4 and −42.4 degrees using the geometrically derived formula:

$$\tan \theta = \sin \alpha$$

The fast axis orientations orthogonal to these are at −47.6 and +47.6 degrees. The angle of incidence on the facet itself $\phi$ may also be calculated to be 73.3 degrees using another geometrically derived formula:

$$\cos \phi = 0.7071 \cos \alpha$$

Figure 7:
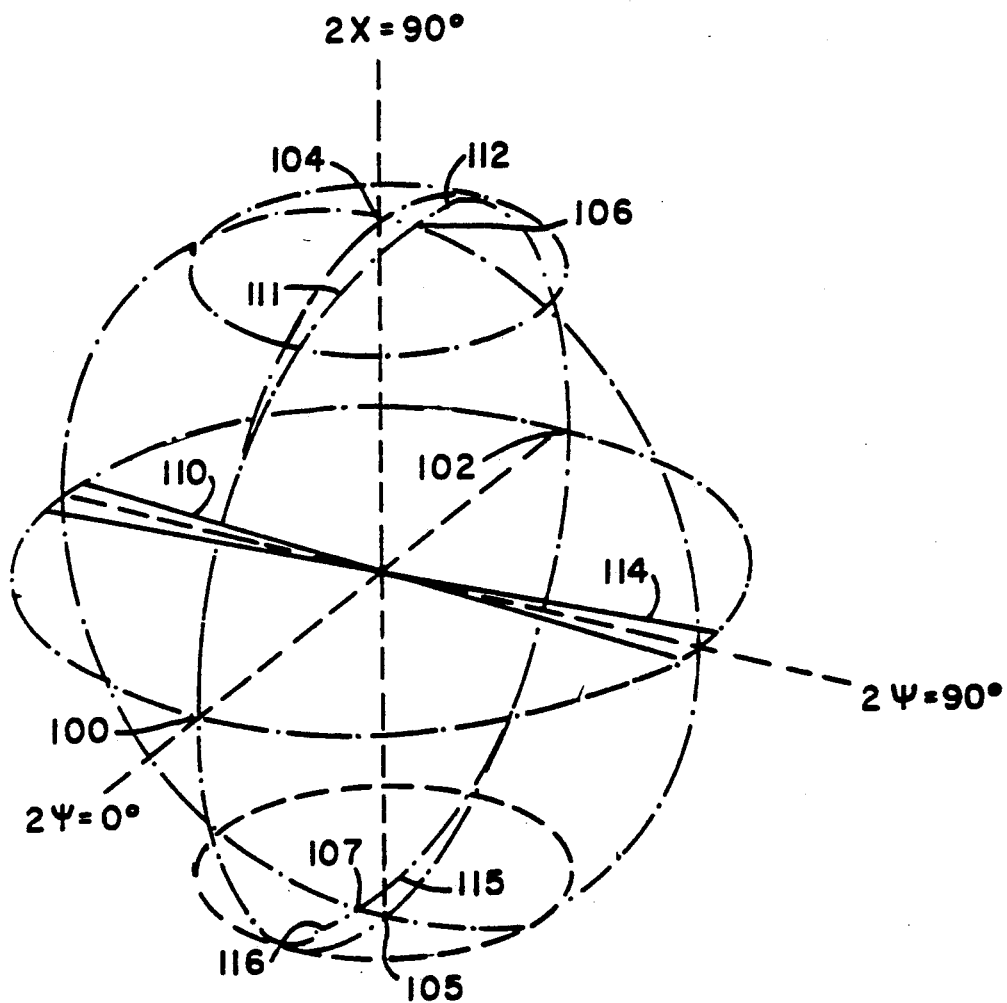
FIG. 7 is a representation of the Poincare sphere to show the polarization transformations resulting from the retardations produced by total internal reflection.

If these facets are left uncoated their total internal reflections would each provide a retardation given by the difference between the phases of the Fresnel reflection coefficients for the TM and TE waves. But in order to achieve their desired function of interconverting light linearly polarized along the x axis with light linearly polarized along the y axis, the two retardations need to be +90.5 and −90.5 degrees so as to transform the polarization states as illustrated on the Poincare sphere diagram shown in FIG. 7. These two linear polarization states may be represented by equatorial points 100 and 102 with longitude $2\psi$ equal to 0 and 180 degrees respectively. The north pole 104 and south pole 105 represent right and left circular polarization states respectively, while other non-equatorial points represent various elliptical polarization states.

A polarization transformation in a retardation element may be represented on the Poincare sphere by an arc about a radial axis the direction of which corresponds to the polarization state of the fast axis. Because the fast and slow axes of the retardations resulting from total internal reflection correspond to linearly polarized normal modes the radial axes 110 and 114 lie in the equatorial plane with $2\psi$ equal to −95.2 and +95.2 degrees. An x polarized TE (s wave) state relative to the liquid crystal cell and represented by point 100 at $2\psi=0$, $2\chi=0$ is transformed by the first facet reflection along arc 111 to an elliptical state 106 with $2\psi=90$, $2\chi=79.844$ and then by the second facet reflection along arc 112 to the y polarized TM (p wave) state represented by point 102 at $2\psi=180$, $2\chi=0$. Conversely, a y polarized TM (p wave) state relative to the liquid crystal cell and represented by point 102 at $2\psi=180$, $2\chi=0$ is transformed by the first facet reflection along arc 115 to an elliptical state 107 with $2\psi=-90$, $2\chi=-79.844$ and then by the second facet reflection along arc 116 to the x polarized TE (s wave) state represented by point 100 at $2\psi=0$, $2\chi=0$.

In the interconversion of x and y polarized light the two successive reflections are approximately equivalent in effect to that of two successive quarter wave plates, the first with $\Gamma=-90$ degrees and its fast axis at $-45$ degrees, the second with $\Gamma=+90$ degrees and its fast axis at $+45$ degrees. The first converts the 0 or 90 degree plane polarized input to circular and the second converts circular to 90 or 0 degree plane polarized output respectively. But the fast axes of the retardations due to reflection are $-47.6$ degrees and $+47.6$ degrees from the x axis, and as can be seen from the Poincare sphere diagram the intermediate state reached will have an ellipticity slightly less than 90 degrees with $2\chi=79.844$ calculated using another geometrically derived formula:

$$\cos 2\chi = \cotan 2\theta$$

The retardation $\Gamma$ required must therefore be slightly greater than 90 degrees, and from the geometry of the Poincare sphere:

$$\Gamma = 90 + \arcsin(\cotan^2 2\theta)$$

The result for $\theta=47.6$ degrees is $\Gamma=90.5$ degrees

The modification of the retardation or differential phase change upon total internal reflection of a light wave has been studied by J. A. Apfel, Graphical Method to Design Internal Reflection Phase Retarders, Applied Optics, Vol. 23, No. 8, pp. 1178-83 (1984). He presents a graphical method for designing a single or multilayer dielectric coating capable of producing the $+90.5$ and $-90.5$ degrees of phase retardations required for the present invention. Using his method a single layer of zirconium dioxide with a refractive index of 1.90 and an optical thickness of 71 degrees may be shown to give a $+90.5$ degree retardation for one facet of the roof prism. For the opposite perpendicular facet a $-90.5$ degree retardation is needed, and a three layer coating is indicated in which the first and third layers are respectively 115 and 63 degrees optical thickness of titanium dioxide with a refractive index of 2.13 and the second layer is 55 degrees optical thickness of magnesium oxide with a refractive index of 1.70.

While the invention has been described in its preferred embodiments, it is to be understood that the words which have been used are words of description rather than of limitation and that changes within the purview of the appended claims may be be made without departing from the true scope and spirit of the invention in its broader aspects.

I claim:

1. An optical switching device comprising:
   first and second optical prisms adjacent a planar interfacial region at least partially filled by a thin liquid crystal layer confined by a spacer material, and one parallel facet of each of said prisms, thereby forming a liquid crystal cell, and transparent conductive electrodes on the walls of said liquid crystal cell;
   polarization beam splitting means within said planar interfacial region adjacent an input end;
   polarization beam recombining means within said interfacial region adjacent an opposite output end of one of said prisms;
   first and second light beam input ports having optical input coupling means at said input end for transmitting light from said optical input coupling means to said polarization beam splitting means, said light having first and second plane polarization components;
   first and second output ports having optical output coupling means at said output end for transmitting light from said polarization beam recombining means to said optical output coupling means, said light having first and second plane polarization components;
   a first reflecting facet on said first prism parallel to said planar interfacial region to reflect the TE (s wave) polarization obliquely incident from said polarization beam splitting means and maintain its polarization state while redirecting it towards a first area of an electrically controlled liquid crystal cell, and mutually perpendicular second and third reflecting facets on said second prism to reflect twice the TM (p wave) polarization obliquely incident from said polarization beam splitting means and thereby convert it to TE (s wave) polarization while redirecting it towards a second area of said electrically controlled liquid crystal cell;
   wherein said transparent conductive electrodes on the walls of said liquid crystal cell are treated to align the unique crystal axis of the contained uniaxially positive nematic crystal perpendicular to the plane of incidence such that TE (s wave) polarized light will be transmitted in the absence of an electric field, and will be reflected when an applied electric field realigns said unique crystal axis perpendicular to said cell walls; and
   TE (s wave) polarized light leaving said liquid crystal cell within said first prism is reflected by said first reflecting facet toward said polarization beam recombining means and TE (s wave) polarized light leaving said liquid crystal cell within said second prism is reflected twice by said second and third reflecting facets thereby converting it to TM (p wave) polarization while redirecting it toward said polarization beam recombining means.

2. The optical switching device of claim 1 in which said polarization beam splitting means and said polarization beam recombining means are comprised of multilayer dielectric coatings which reflect TE (s wave) polarized light and transmit TM (p wave) polarized light applied on one parallel facet adjacent said interfacial region and an index matching liquid filling the remainder of said region.

3. The optical switching device of claim 2 in which said first reflecting facet has a multilayer dielectric coating which reflects TE (s wave) polarized light and transmits TM (p wave) polarized light into an overlying index matched absorbing paint.

4. The optical switching device of claim 1 in which said polarization beam splitting means and said polarization beam recombining means comprise extensions of said electrically controlled liquid crystal cell with segmented transparent conductive electrodes such that the extended regions remain electrically unactivated to reflect TM (p wave) polarized light and transmit TE (s wave) polarized light.

* * * * *